April 21, 1925.  
I. H. ATHEY ET AL  
VEHICLE  
Filed Feb. 1, 1923  
1,534,255  
2 Sheets-Sheet 2
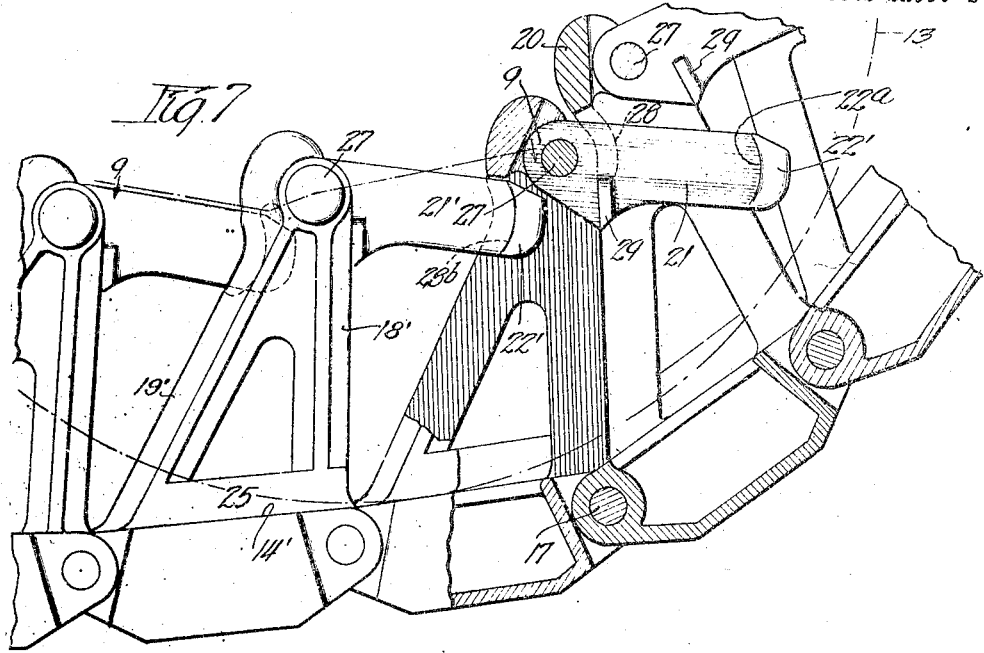
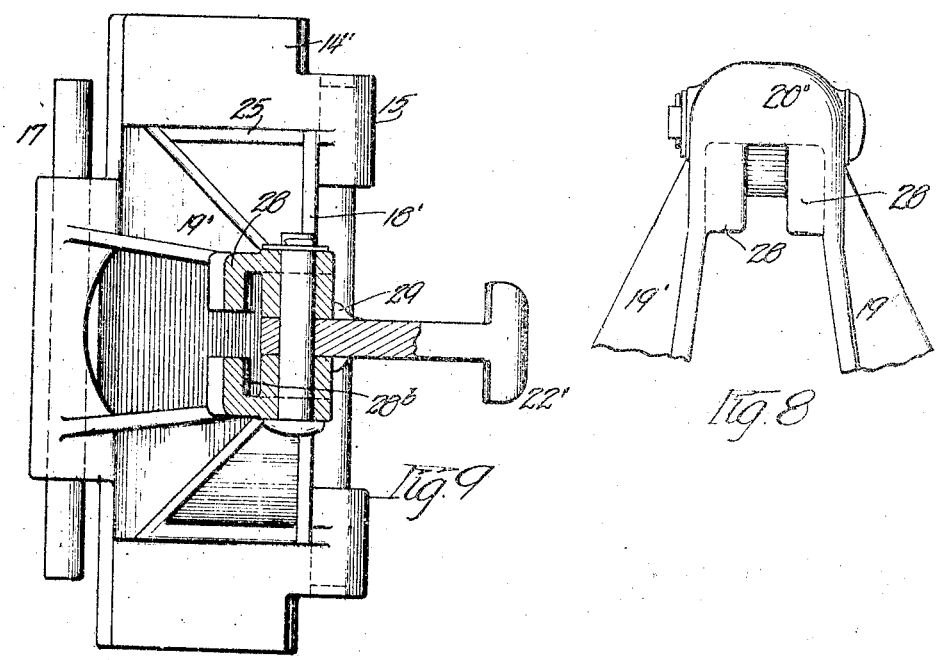
Inventor
Isaac H. Athey
R. W. Baily
William Bradbury Patented Apr. 21, 1925.

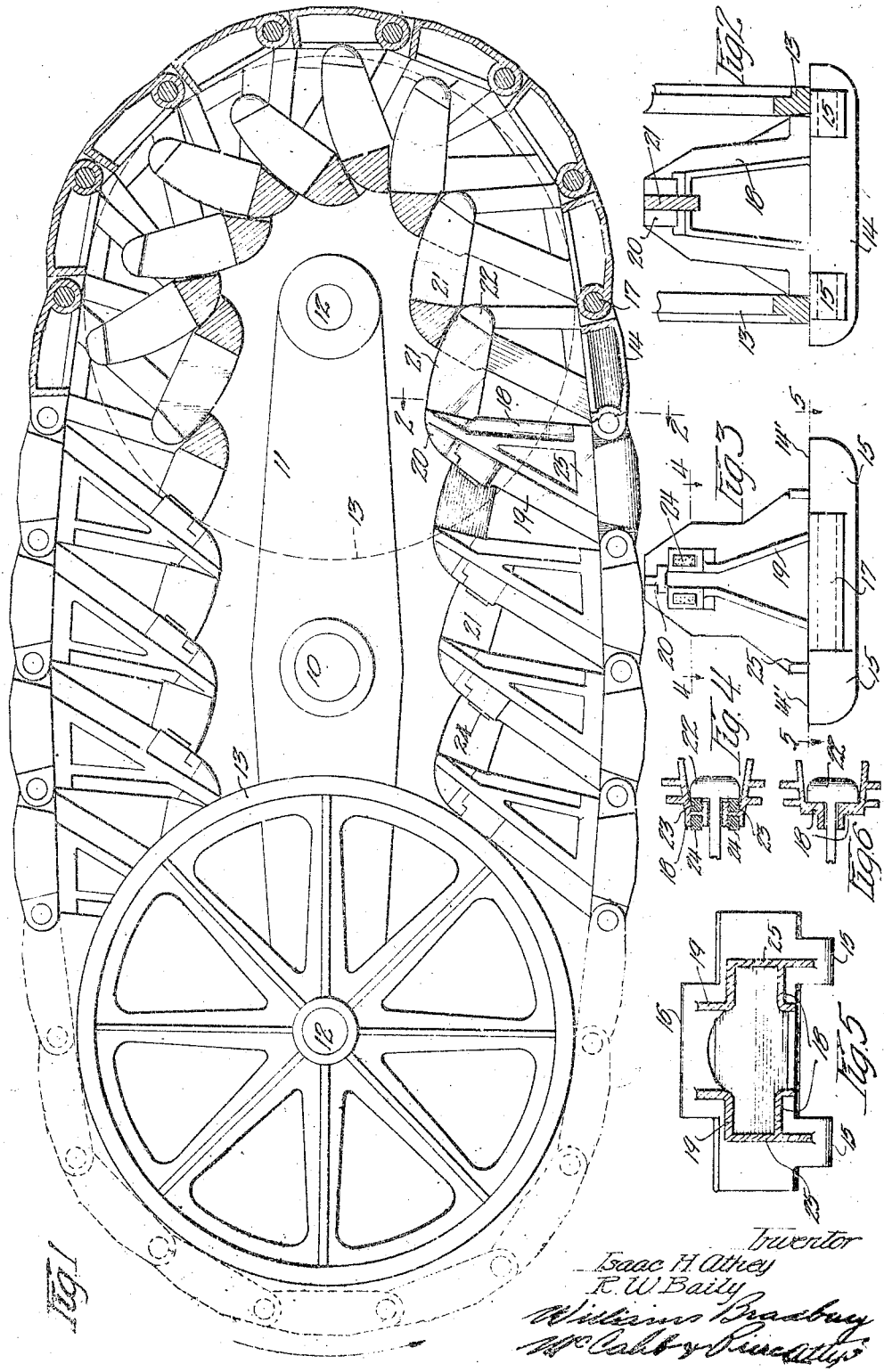

1,534,255

UNITED STATES PATENT OFFICE.

ISAAC H. ATHEY AND ROBERT W. BAILY, OF CHICAGO, ILLINOIS, ASSIGNORS TO ATHEY TRUSS WHEEL CO., OF CHICAGO, ILLINOIS, A CORPORATION OF ILLINOIS.

VEHICLE.

Application filed February 1, 1923. Serial No. 616,393.

*To all whom it may concern:*

Be it known that we, ISAAC H. ATHEY and ROBERT W. BAILY, citizens of the United States, and residents of Chicago, in the county of Cook and State of Illinois, have invented a certain new and useful Improvement in Vehicles, of which the following is a full, clear, concise, and exact description, reference being had to the accompanying drawings, forming a part of this specification.

Our invention relates to improvements in vehicles and is particularly concerned with improvements in that type of vehicle in which the load supporting wheels roll upon endless chains or tracks.

The objects of our invention are:

First: To provide a vehicle of the character described in which the endless tracks are composed of a plurality of shoes pivotally connected together at their edges and each including one or more inwardly extending arms, the arms of adjacent shoes being so related as to provide means for trussing or holding the track rigid while the shoes are under load;

Second: To provide a flexible track wherein pivotal movements between elements of the truss are reduced.

Third: To provide an endless track of the character described, in which the various truss arms are arranged so that they may be compactly folded together where the endless track passes around the wheels.

Fourth: To provide a track construction which is particularly adapted for use on vehicles, such as referred to, which are intended to operate at high speeds.

Other objects of our invention will appear as this description progresses, reference being had to the accompanying drawings, in which Figure 1 is a side elevation of one side of a vehicle embodying our invention, this elevation being partially in vertical section;

Figure 2 is a transverse section taken on line 2—2 of Figure 1;

Figure 3 is an end view of one of the shoes forming a part of our improved track chain;

Figure 4 is a transverse section taken on line 4—4 of Figure 3;

Figure 5 is a horizontal section taken on line 5—5 of Figure 3;

Figure 6 is a view similar to Figure 4, but showing a modified construction;

Figure 7 is a side elevation of a modified form of our invention, portions thereof being broken away, and parts of the figure being in vertical section;

Figure 8 is an end view of one of the shoes, portions thereof being broken away, and Figure 9 is a transverse section taken on line 9—9 of Figure 7.

Throughout the several views, similar reference characters will be used for referring to similar parts, and the various sections are taken looking in the directions of the small arrows.

Referring for the present to Figures 1 to 5 inclusive, we have illustrated our invention as forming part of a vehicle comprising an axle 10, carrying the load supporting frame which is not shown. A beam 11 is mounted upon each end of the axle 10, and a shaft 12 is journaled in and projects from the opposite sides of each end of the beams 11. A pair of load supporting wheels 13 are carried by the projecting ends of the shafts 12. It is to be understood that the shafts 12 may be journaled in the ends of the beam 11, and the wheels 13 rigidly secured to the ends of the shafts, or that the shafts 12 may be rigidly mounted in the ends of the beam 11, and the wheels 13 rotatably mounted upon the shafts.

Each of the shoes forming the endless tracks upon which the wheels 13 roll comprises a tread member or portion 14 which is preferably of hollow construction. A pair of hinge lugs 15 extend outwardly from one side of each tread portion and a single lug 16 extends outwardly from the opposite side. Lugs 15 are spaced apart so as to receive between them the hinge lug 16 of an adjacent shoe. Pins 17 pass through aligned openings in the hinge lugs 15 and 16 and provide means for hinging or pivotally interconnecting the adjacent edges of the tread members.

A pair of truss arms 18 extend inwardly substantially perpendicularly from one side of each of said shoes, and another pair of truss arms 19 extend inwardly from the opposite side of each shoe and incline toward the adjacent truss arms on the opposite side of the shoe. The truss arms at each end of the link incline toward the truss arms at the other end of the link, and are combined by the integrally formed tie or head portion 20. It will be noted from an inspection of Figure 5 that the truss arms are substantially L-shaped, in cross-section so as to provide a maximum degree of strength.

A truss link 21 is rigidly connected with the inner ends of the truss arms of each shoe and projects, or extends, laterally between the truss arms of the next adjacent shoe. Each of these links is provided with a head 22 for engaging the resilient buffers 23, of rubber or other suitable material, which are set into suitable grooves or pockets formed at the inner ends of arms 18.

Similar resilient buffers 24 carried by pockets formed on the opposite side of the same members provide means for cushioning the contact between the inner ends of the truss arms of adjacent shoes when the links fold into each other, as shown at the right hand end of Figure 1, to permit the bending of the chain around the load supporting wheels.

If desired, the buffers 23 and 24 may be omitted, and the head 22 of the truss link permitted to engage directly against truss arms 18 as shown in Fig. 6, when the track is under load.

Ribs or flanges 25 extending transversely of the shoe and connecting portions of the truss arms 18 and 19 provide means for centering or aligning the shoes with respect to the pairs of load supporting wheels which roll upon the upper sides 14' of the end portions of the shoes, as shown in Figure 1.

In the form of our invention shown in Figures 1 to 6 inclusive, unless there is complete contact between the inside of a head and the contacting portions of the truss arms, stresses may be imposed upon the truss links tending to flex them vertically, and may be sufficiently great to break the truss links from the truss arms. Where such construction would be objectionable, we propose to connect the truss links 21' with the inner ends of the truss arms by means of the pivot pins 27 (see Figures 7 to 9 inclusive) which are supported by the inner ends of the truss arms, and extend through the truss links. To further insure a proper bearing between each head 22' and the flanges 28 extending toward each other from the inner ends of the inclined truss arms 19', we make the contacting surfaces 22ª, and 28ᵇ of the heads 22' and the flanges 28, respectively, cylindrical in form, so as to insure the proper seating of the heads upon the flanges.

To prevent the outer ends of the links 21' from moving outwardly so far during the folding of the links, as the track passes around the wheels, that the heads 22' cannot engage the flanges 28 when the shoes straighten out, we provide each link with laterally extending lugs 29, which are adapted to engage the edges of the truss arms 18' and thus limit the movement of the links 21'.

From the above description, it will be apparent that we have provided a construction in which there is no movement, or practically none, between the truss links and the truss arms by which they are carried, thereby eliminating wear at these points. We have also provided a construction in which the truss links and the truss arms can fold together compactly at the points where the track chains pass around the load supporting wheels. We have also provided a construction which is simple, economical to manufacture, and extremely rugged.

While we have described the details of construction of the preferred embodiment of our invention, it is to be clearly understood that our invention is not limited to these details, but is capable of other adaptations and modifications within the scope of the appended claims.

Having thus described our invention, what we claim is:

1. A track chain for a vehicle comprising a plurality of shoes, each of said shoes comprising a tread member, the adjacent edges of said tread members being pivotally connected, a truss arm extending inwardly from each end of one side of each of said tread members, a truss arm extending inwardly from each end of the opposite side of said tread member, and inclining toward said first named truss arms, resilient buffers secured to the front and rear sides of said last named truss arms, and a truss link rigidly connected to the upper ends of the truss arms of each link and projecting between the inclined truss arms of the next adjacent shoe, said link having a head at its free end for engaging the buffer on one side of said inclined truss arms.

2. A track chain for a vehicle comprising a plurality of shoes, each of said shoes comprising a tread member, the adjacent edges of said tread members being pivotally connected, a truss arm extending inwardly from each end of one side of each of said tread members, a truss arm extending inwardly from each end of the opposite side of said tread member, and inclining toward said first named truss arms, and a truss link connected to the upper ends of the truss arms of each link and projecting between the inclined truss arms of the next adjacent shoe, said link having a head at its free end for engaging one side of said last named inclined truss arms.

3. A track chain for a vehicle comprising a plurality of shoes, each of said shoes comprising a tread member, the adjacent edges of said tread members being pivotally connected, a pair of truss arms extending inwardly from each longitudinal edge of said tread member, all of said truss arms converging toward each other, and a truss link rigidly carried by the truss arms of each shoe and projecting between the truss arms of the next adjacent shoe, said truss link having a head for engaging some of the truss arms of said adjacent link.

4. A track chain for a vehicle comprising a plurality of shoes, each of said shoes comprising a tread member, the adjacent edges of said tread members being pivotally connected, a pair of truss arms extending inwardly from each longitudinal edge of said tread member, all of said truss arms converging toward each other, and a truss link carried by the truss arms of each shoe and projecting between the truss arms of the next adjacent shoe, said truss link having a head for engaging some of the truss arms of said adjacent link.

5. A vehicle track comprising a series of tread shoes pivotally connected together to form an endless flexible belt and each shoe formed to provide a wheel supporting surface adjacent its opposite ends, and a series of pairs of rigid trussing elements projecting rigidly inwardly from the shoes, said trussing elements of adjacent shoes being so related that they move relatively to each other to permit the shoes to pivot and fold together in one direction and to limit the pivotal movement between shoes in the reverse direction to hold them relatively rigid under load.

6. A shoe for a track chain comprising a tread member, a truss arm projecting inwardly from each end of one side of said tread member, a truss arm projecting inwardly from one end of the opposite side of said tread member, said last named truss arm being inclined toward said first named truss arm, and a truss link rigidly supported by said truss arms and projecting therefrom, said truss link having a head at its free end.

7. A vehicle track chain comprising a series of pivotally interconnected tread members, each tread member having a pair of truss arms projecting inwardly therefrom, and each pair of truss arms having a headed truss link which projects therefrom and extends and may reciprocate between the truss arms of an adjacent tread member, the head of each truss link engaging both of the truss arms between which the link passes and co-operating therewith to limit the separation of the inner ends of the truss arms.

8. A vehicle track chain having a series of pivotally interconnected tread members forming an endless tread, each tread member having a pair of spaced truss arms projecting inwardly therefrom, and a rigid truss link connected to each pair of truss arms and co-operating with both truss arms of an adjacent tread member to limit the tilting thereof.

9. A vehicle track chain having a series of pivotally interconnected tread members, each tread member having a pair of spaced truss arms projecting inwardly therefrom, and a rigid truss link rigidly connected to the truss arms of each tread member and positioned to engage both truss arms of an adjacent tread member to limit the separation of inner ends of the truss arms.

10. A flexible track for vehicles comprising a series of shoes hinged together to form an endless belt; each shoe having a tread member, two spaced apart truss arms extending inwardly from the tread member, and a rigid truss link rigidly carried by the truss arms, the truss link of each shoe extending between truss arms of an adjacent shoe and co-operating to render the track relatively rigid under load.

11. A flexible track for vehicles comprising a series of shoes hinged together to form a flexible endless belt; each shoe having a tread member, two spaced apart truss arms rigidly projecting inwardly from the tread member, and a truss link lying laterally of the tread member and between the truss arms of an adjacent shoe and co-operating to render relatively rigid that portion of the track which is under load.

12. A flexible track for vehicles comprising a series of pivotally interconnected shoes; each shoe having a tread member and a pair of truss arms extending inwardly therefrom, and each shoe having a truss link rigidly associated therewith and movable between the truss arms of an adjacent shoe when the shoes move about their interconnecting pivot in one direction and co-operating therewith to limit the pivotal movement between the shoes in the reverse direction.

In witness whereof, we hereunto subscribe our names this 10th day of January, 1923.

ISAAC H. ATHEY.
ROBERT W. BAILY.

Witnesses:
J. DAVID DICKINSON,
OLIVER H. PARMELEE.